(12) United States Patent
Kugel

(10) Patent No.: US 9,369,372 B1
(45) Date of Patent: Jun. 14, 2016

(54) METHODS FOR NETWORK FORWARDING DATABASE FLUSHING

(71) Applicant: Altera Corporation, San Jose, CA (US)

(72) Inventor: Alexander Kugel, High Wycombe (GB)

(73) Assignee: Altera Corporation, San Jose, CA (US)

( * ) Notice: Subject to any disclaimer, the term of this patent is extended or adjusted under 35 U.S.C. 154(b) by 201 days.

(21) Appl. No.: 13/802,144

(22) Filed: Mar. 13, 2013

(51) Int. Cl.
*H04L 12/751* (2013.01)
*H04L 12/931* (2013.01)

(52) U.S. Cl.
CPC .............. *H04L 45/02* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 6,434,612 B1 | 8/2002 | Hughes et al. | |
| 7,835,358 B2 | 11/2010 | Gallatin et al. | |
| 7,961,728 B2 | 6/2011 | Daines et al. | |
| 2006/0092860 A1* | 5/2006 | Higashitaniguchi et al. | 370/255 |
| 2007/0076719 A1 | 4/2007 | Allan et al. | |
| 2008/0068985 A1* | 3/2008 | Mieno | 370/217 |
| 2008/0240106 A1* | 10/2008 | Schlenk | 370/392 |
| 2009/0028121 A1* | 1/2009 | Kinoshita | 370/338 |
| 2009/0207742 A1* | 8/2009 | Suzuyama et al. | 370/249 |
| 2009/0238179 A1 | 9/2009 | Samprathi | |
| 2010/0002702 A1* | 1/2010 | Saito et al. | 370/392 |
| 2010/0027543 A1 | 2/2010 | Rustagi et al. | |
| 2010/0039961 A1 | 2/2010 | Tallet et al. | |
| 2010/0220730 A1 | 9/2010 | Finn et al. | |
| 2010/0265952 A1* | 10/2010 | Cameron et al. | 370/392 |
| 2011/0280242 A1 | 11/2011 | Kugel et al. | |
| 2012/0051252 A1* | 3/2012 | Iwao et al. | 370/252 |
| 2012/0257539 A1 | 10/2012 | Kugel et al. | |
| 2013/0073706 A1* | 3/2013 | Iijima et al. | 709/223 |
| 2013/0188645 A1* | 7/2013 | Mack-Crane | 370/392 |
| 2013/0194914 A1* | 8/2013 | Agarwal et al. | 370/225 |

OTHER PUBLICATIONS

"Virtual Private LAN Services (VPLS)", Cisco IOS Software Configuration Guide, Release 15.0SY, May 17, 2013, Chapter 38, Cisco Systems Inc.
"Virtual Private LAN Service Architectures and Operation", White Paper, 1992-2004, p. 1-30, Cisco Systems, Inc.
RFC 4762, Lasserre et al., "Virtual Private LAN Serice (VPLS) Using Lable Distribution Protocol (LPD) Signaling", Network Working Group, Standards Track, Jan. 2007.

(Continued)

*Primary Examiner* — Chi H Pham
*Assistant Examiner* — Soon-Dong D Hyun
(74) *Attorney, Agent, or Firm* — Treyz Law Group, P.C.; Michael H. Lyons

(57) ABSTRACT

A network switch may include ports at which network packets are received from a network. The switch may maintain a packet forwarding database having forwarding database entries that are each associated with a corresponding port. The switch may perform flushing operations to delete forwarding database entries that are associated with a selected port or a selected group of ports. The flushing operations may be performed by modifying an aging table that is maintained by the switch. The aging table may include entries that each identifies an aging threshold value and at least one port of the switch. Flushing operations for a selected port may be performed by setting the aging threshold value to zero for an aging table entry that correspond to the selected port so that forwarding table entries associated with the selected port are deleted during a subsequent aging process.

28 Claims, 12 Drawing Sheets

(56) References Cited

OTHER PUBLICATIONS

RFC 3916, Xiao et al., Requirements for Pseudo-Wire Emulation Edge-to-Edge (PWE3), Network Working Group, The Internet Society, Sep. 2004.

Dutta et al., "LDP Extensions for Optimized MAC Address Withdrawal in H-VPLS-draft-ietf-12vpn-vpls-ldp-mac-opt-06.txt", L2VPN Working Group, May 2012.

Wikipedia contributors. "IEEE 802.1ad", Wikipedia, The Free Encyclopedia, [online], retrieved Jun. 5, 2013 <URL: http://en.wikipedia.org/wiki/IEEE_802.1ad#cite_note-1>.

"Virtual Private LAN Services", My NetworkingWiki, [online], retrieved Jan. 25, 2013 <URL: mynetworkingwiki.com/index.php/Virtual_Private_LAN_Services>.

"VPLS Overview", Cisco Press, [online], retrieved Jan. 21, 2013 <URL: fengnet.com/books/ios_mpls/ch12lev1sec1.html>.

* cited by examiner

NETWORK PACKET

| VSI | Network Address | Port | Timestamp | |
|---|---|---|---|---|
| VSI1 | ADR1 | P1 | T1 | ~144A |
| VSI2 | ADR2 | P2 | T2 | ~144B |
| VSI1 | ADR3 | V3 | T4 | ~144C |
| VSI2 | ADR1 | P2 | T3 | ~144D |
| ... | ... | ... | ... | |

FORWARDING DATABASE

FIG. 8

| AGING GROUP | AGING THRESHOLD (SECONDS) | LEARNING ENABLED | |
|---|---|---|---|
| I0 | 300 | YES | ←—174A |
| I1 | 1800 | YES | ←—174B |
| I2 | 30 | NO | ←—174C |
| ⋮ | ⋮ | | |

PER-GROUP AGING TABLE

FIG. 11

METHODS FOR NETWORK FORWARDING DATABASE FLUSHING

BACKGROUND

This relates to integrated circuits that serve as packet forwarding devices in networks. Networks such as the internet and other packet-based networks include switches that forward network packets through the networks. In some scenarios, Layer 2 virtual switches (sometimes referred to as VSIs or virtual switching instances) are implemented on switches in the network. A Layer 2 virtual switch provides the switching between ports that are coupled to other network devices (e.g., switches) via network paths. The switches maintain packet forwarding databases (FDBs) that are used to determine how to forward the network packets. L2 switching FDBs associate source MAC addresses with destination ports. Forwarding databases are created through a learning process. In some scenarios the MAC addresses are required to be removed from the forwarding databases. This can be either done periodically through the "aging" process or after a change in the network topology through the "flushing" process which is followed by the "learning" stage. Packet forwarding databases are often flushed on a per-virtual switch instance basis in which all forwarding database entries of a particular virtual switching instance are deleted together. In practice, however, a change in a network topology requires to flush MAC addresses learned on multiple ports. Since each port can be associated with many VSIs, flushing on a per-VSI basis tends to be memory inefficient. For example, a single L2 switching device may have thousands of virtual switching instances that are associated with only a few ports.

SUMMARY

Integrated circuits such as programmable integrated circuits may be configured to serve as network switches. An integrated circuit that serves as a network switch may include packet processing circuitry, storage circuitry such as registers, and ports at which network packets are received from a network. The switch may maintain a packet forwarding database having forwarding database entries that are each associated with a corresponding port of the switch. Ports of the switch may include virtual ports, physical ports, or any desired logical entity that the switch uses to forward and/or receive network traffic. For example, ports of the switch may include physical ports, Link Aggregation ports, Pseudowires, VLAN trunks, VLAN Sub-interfaces, etc.

In order to facilitate aging operations, each forwarding database entry may include a timestamp and one or more matching fields to match against network packets. Additionally, the switch may maintain a table of preconfigured aging timers (threshold values) associated with ports or group of ports. The aging threshold values may be stored in a table of aging timers. These aging threshold values may be maintained at the storage circuitry in storage such as random-access memory (RAM) either internal or external to the switch.

The aging table may include entries that each identifies an aging threshold value and at least one group of ports of the switch. Each group of ports may consist of at least one port (or more). The switch may periodically perform aging processes (mechanisms) on each entry in the forwarding database. The aging mechanism calculates the difference between the current time and the timestamp of each entry in the forwarding database. The difference is then compared with the value of aging timer associated with the port that is identified by the entry in the forwarding database. If the calculated difference is greater than the time value, the aging mechanism deletes expired forwarding table entries.

The switch may perform flushing operations to delete forwarding database entries that are associated with a selected port or a selected group of ports. The flushing operations may be performed by modifying aging timer thresholds associated with the port or group of ports.

Flushing operations for a selected port (or group of ports) may be performed by setting the aging threshold value to zero for aging table entries that correspond to the selected port(s). By setting the aging threshold value to zero, forwarding table entries that are associated with the selected port may be identified as expired and removed during a subsequent aging process. Prior to setting aging threshold values to zero, the existing aging threshold values may be stored so that they may be restored upon completion of the aging process. To avoid race conditions between forwarding database updates and flushing operations, MAC addresses learning (e.g., forwarding database updates) may be disabled at the selected port prior to performing the flushing operations.

Further features of the invention, its nature and various advantages will be more apparent from the accompanying drawings and the following detailed description of the preferred embodiments.

BRIEF DESCRIPTION OF THE DRAWINGS

FIG. 8 is a diagram of an illustrative forwarding database that may be maintained by a packet forwarding device in accordance with an embodiment of the present invention.

FIG. 11 is a diagram of an illustrative per-group aging table that may be maintained by a packet forwarding device in accordance with an embodiment of the present invention.

DETAILED DESCRIPTION

The present invention relates to integrated circuits such as programmable integrated circuits that are configured to perform packet forwarding operations in a network. The programmable integrated circuits may include programmable logic, programmable interconnects, programmable routing circuitry.

Figure 1:
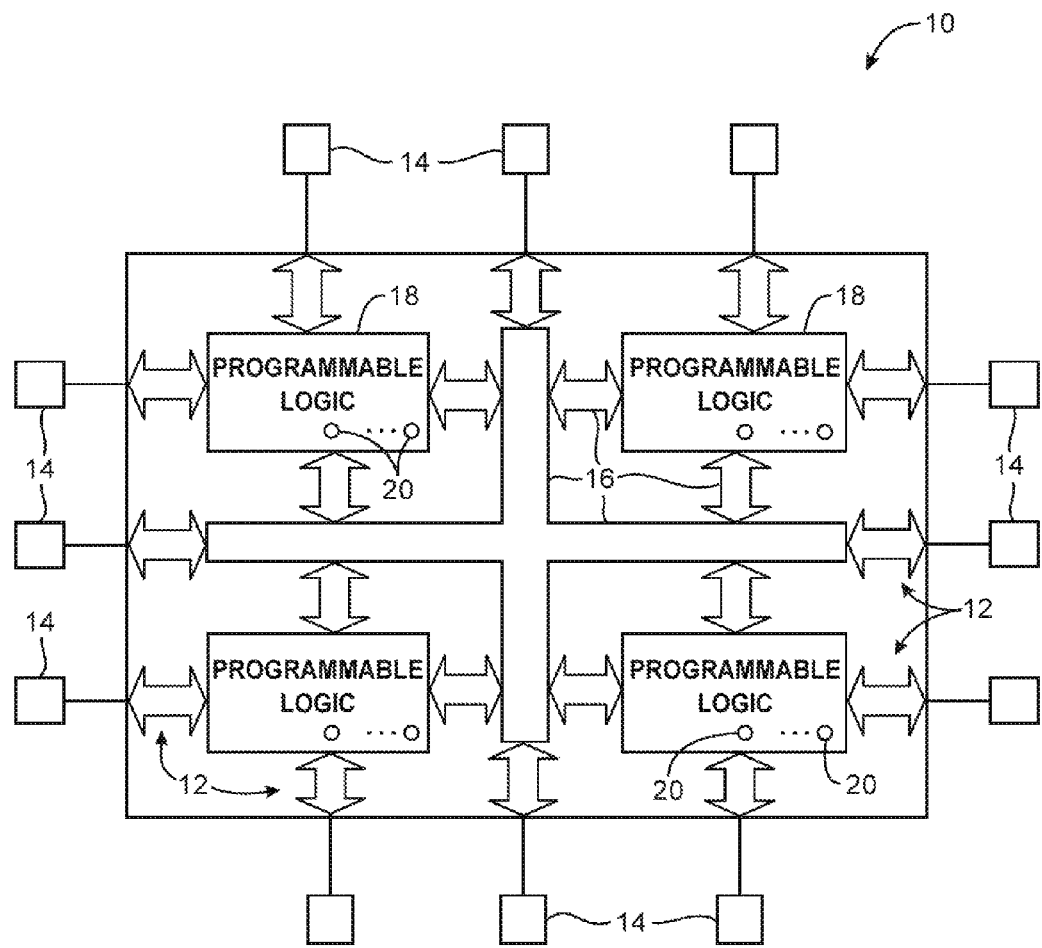
FIG. 1 is an illustrative diagram of a programmable integrated circuit that may be configured as a packet forwarding device in accordance with an embodiment of the present invention.

FIG. 1 shows a diagram of an illustrative programmable integrated circuit device. As shown in FIG. 1, device 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Interconnection resources 16 may sometimes be referred to herein as interconnects (e.g., interconnects formed from combinations of fixed interconnects and programmable interconnects).

Interconnects 16 may be used to interconnect regions of programmable logic such as programmable logic regions 18. Programmable logic regions 18 may sometimes be referred to as logic array blocks or programmable circuit regions. Programmable logic regions 18, may, if desired, contain groups of smaller logic regions. These smaller logic regions, which may sometimes be referred to as logic elements or adaptive logic modules, may be interconnected using local interconnection resources.

Programmable logic regions 18 may include combinational and sequential logic circuitry. For example, programmable logic regions 18 may include look-up tables, registers, and multiplexers. Programmable logic regions 18 may be configured to perform a custom logic function such as packet forwarding and processing functions.

Programmable logic regions 18 contain programmable elements 20. Programmable elements 20 may be based on any suitable programmable technology, such as fuses, antifuses, electrically-programmable read-only-memory technology, random-access memory cells, mask-programmed elements, etc. As an example, programmable elements 20 may be formed from memory cells. During programming, configuration data is loaded into the memory cells using pins 14 and input-output circuitry 12. The memory cells are typically random-access-memory (RAM) cells. Because the RAM cells are loaded with configuration data, they are sometimes referred to as configuration RAM cells (CRAM).

Programmable elements 20 may be used to provide static control output signals for controlling the state of logic components in programmable logic 18. The output signals generated by elements 20 are typically applied to gates of metal-oxide-semiconductor (MOS) transistors (sometimes referred to as pass gate transistors).

The circuitry of device 10 may be organized using any suitable architecture. As an example, logic 18 of programmable device 10 may be organized in a series of rows and columns of larger programmable logic regions, each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Other device arrangements may use logic that is not arranged in rows and columns.

Programmable logic devices 10 may be configured to perform packet forwarding operations in a packet-switched network such as the internet and local networks that are coupled to the internet. Input-output pins 14 may be configured (programmed) to serve as switch ports, whereas one or more programmable logic regions may be configured to perform network packet processing functions on network packets that are received at the switch ports. Programmable interconnects 16 may be configured to convey network packets between programmable logic regions 18 and input/output pins 14.

Devices that perform packet forwarding operations may include packet forwarding devices (sometimes referred to herein as switches or network switches). Packet forwarding devices may, for example, include routers or other packet forwarding devices. Examples in which packet forwarding devices are implemented using programmable logic devices 10 are sometimes described herein. These examples are, however, merely illustrative. If desired, packet forwarding devices may be implemented using any desired circuitry. For example, packet forwarding devices may be implemented using application-specific integrated circuit devices, general-purpose processing circuit devices, or processing circuitry of other electronic devices.

Figure 2:
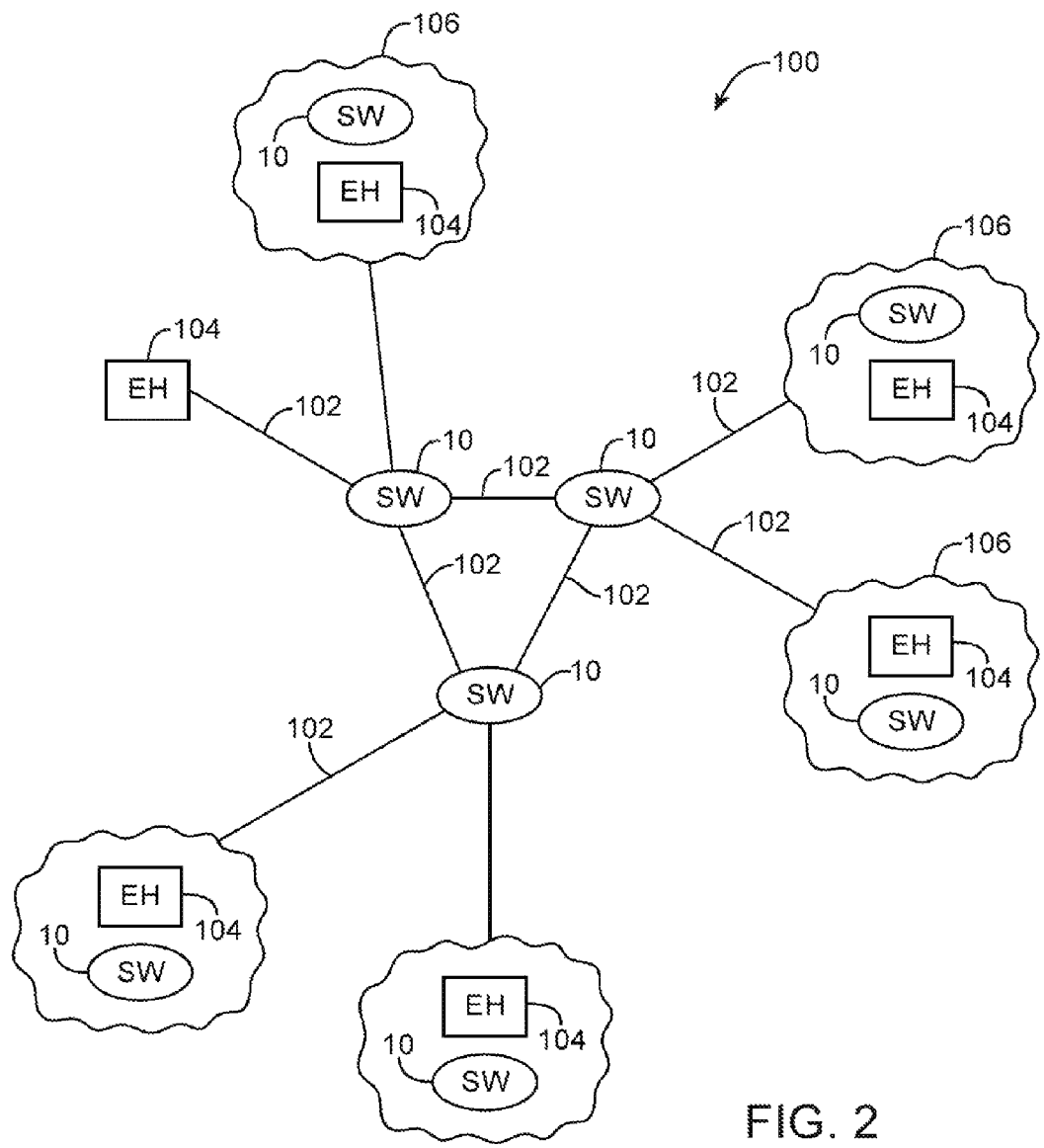
FIG. 2 is a diagram of an illustrative network including packet forwarding devices that may maintain network forwarding databases in accordance with an embodiment of the present invention.

FIG. 2 is an illustrative diagram of a network 100 including switches 10. Switches 10 may be coupled via network paths 102 to other switches and to end hosts 104. For example, switches 10 may be coupled via network paths 102 to additional network portions 106 that include additional switches 10 and end hosts 104. End hosts 104 may serve as packet source and packet destinations of network 102. For example, a first end host 104 that serves as a packet source may send a network packet to a second end host 104 that serves as a packet destination. In this scenario, switches 10 may forward the network packet through network 102 along network paths 102 from the packet source end host to the packet destination end host. Examples of end hosts may include personal computers, tablet computers, cellular telephones, or other network-connected computing equipment.

Network paths 102 may include wired paths (e.g., network cables that are directly coupled between switches 10) or wireless paths. If desired, network paths 102 may include logical paths that are formed by configuring switches 10 and network 102. For example, intermediate switches may be interposed between switches 10. In this scenario, the intermediate switches may be configured to implement all or portions of network paths 102 by forwarding network packets along dedicated (e.g., predetermined) paths between switches 10. A logical path between switches may emulate a direct network connection between the switches even when the logical path is implemented using intermediate network elements (e.g., switches or routers). Logical paths may therefore sometimes be referred to as pseudowires. As an example, a pseudowire may be formed via network tunneling between switches 10 so as to emulate a direct connection between the switches.

Figure 3:
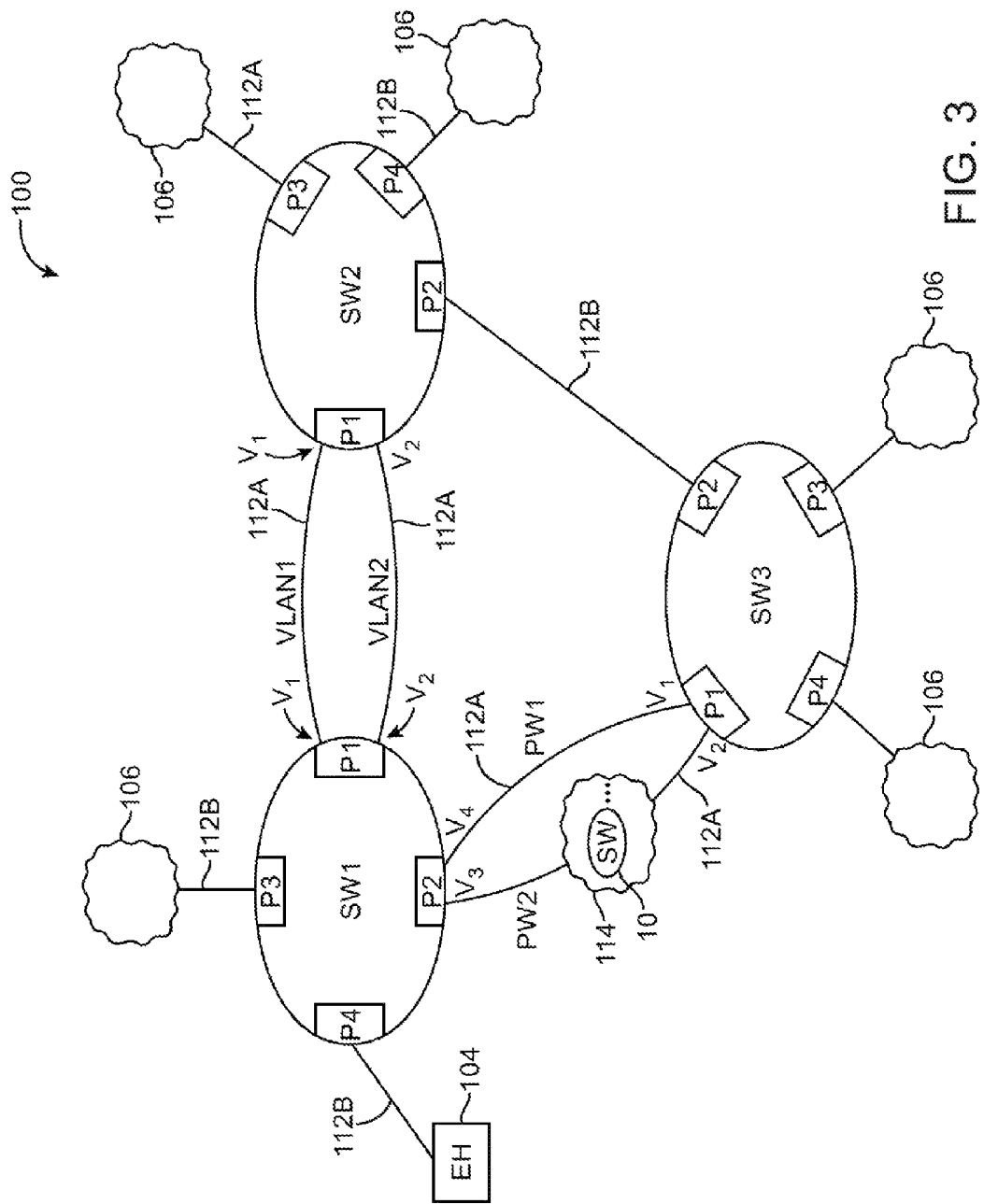
FIG. 3 is a diagram of an illustrative network including packet forwarding devices that may maintain network forwarding databases based on physical and virtual ports in accordance with an embodiment of the present invention.

FIG. 3 is an illustrative diagram of network 100 in which switches 10 are coupled via physical and virtual links (e.g., paths between switches). As shown in FIG. 3, switches 10 may include physical ports that are coupled to other switches via virtual links 112A and physical links 112B. In the example of FIG. 3, switches SW1, SW2, and SW3 each include physical ports P1, P2, P3, P4. However, this example is merely illustrative. In general, switches in network 100 may include any desired number of physical ports (e.g., two ports, three ports, four ports, eight ports, etc.).

Physical links 112B may be direct connections between physical ports of client switches such as a network cable that is plugged in to the physical ports. Each physical link 112B is coupled between a respective pair of physical ports. Each physical port may accommodate only one physical link 112B so that a 1:1 ratio is maintained between each physical link and a respective pair of physical ports. As an example, port P2 of switch SW3 and port P2 of switch SW2 may be coupled by a physical link 112B.

Virtual links 112A may be formed between switches. The virtual links may be implemented using physical links by partitioning network traffic between the physical ports of the physical links. As an example, a first virtual link 112A between physical ports P1 of switches SW1 and SW2 may serve to convey network traffic for virtual local area network VLAN1, whereas a second virtual link 112A between the physical ports may serve to convey network traffic for virtual local area network VLAN2. As another example, pseudowires PW1 and PW2 may serve to convey respective portions of network traffic between port P2 of switch SW1 and port P1 of switch SW3, even though each physical port may only accommodate one physical link.

In some scenarios, a virtual link between switch ports may include intervening network elements such as additional switches. For example, pseudowire PW2 may be implemented using network elements such as additional switches 10 in an intervening network portion 114 between port P2 of switch SW1 and port P1 of switch SW3. In this scenario, switches 10 of network portion 114 may be configured to forward network traffic associated with pseudowire PW2 between switches SW1 and SW3 as if a direct physical link exists between the switches (e.g., by emulating a direct physical link using multiple physical links and network forwarding devices of network portion 114).

Interfaces of switches 10 that are coupled to virtual links may be referred to as virtual ports or virtual interfaces. For example, switch SW1 may include virtual ports V1, V2, V3, and V4 that are coupled to virtual links 112A. Similarly, switches SW2 and SW3 may each include virtual ports V1 and V2. Multiple virtual ports may be formed from a physical port. For example, virtual ports V1 and V2 of switch SW1 may be formed from partitioning network traffic that traverses physical port P1 of switch SW1. This example is merely illustrative. If desired, a virtual port may include network traffic from multiple physical ports. Virtual and physical ports may sometimes be referred to as logical ports or logical interfaces of a switch.

Figure 4:
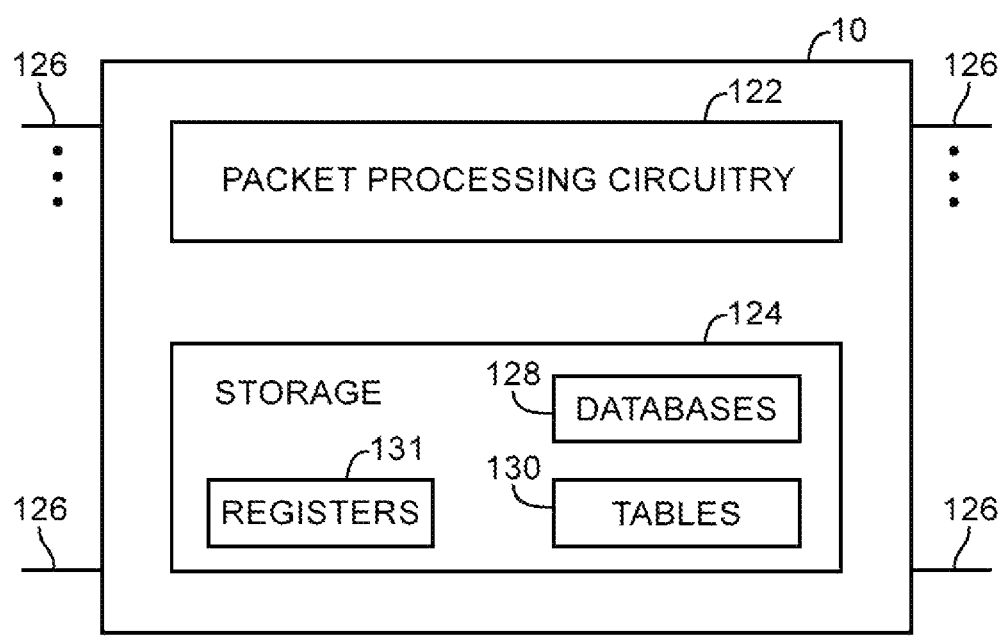
FIG. 4 is a diagram of an illustrative packet forwarding device that may maintain a network forwarding database in accordance with an embodiment of the present invention.

FIG. 4 is an illustrative diagram of a switch 10 that may be configured to forward network packets through a network. As shown in FIG. 4, switch 10 may include packet processing circuitry 122, storage 124, and ports 126. Ports 126 may be logical ports that may be coupled to other switches via physical and virtual links. For example, ports 126 may include virtual ports such as virtual ports V1 and V2 of switch SW1 and physical ports such as ports P1 and P2 of switch SW1 (see, e.g., FIG. 3). Switch 10 may include any desired number of ports (e.g., 2, 4, 8, etc.).

Packet processing circuitry 122 may process incoming network packets received at ports 126 and forward the network packets from ports 126. A network packet may be processed by retrieving information from the network packet that is subsequently used to determine how to forward the network packet. For example, information such as address information may be retrieved from the network packet and used to determine which port 126 should be used in forwarding the network packet.

Packet processing circuitry 122 may be implemented using programmable logic or as dedicated processing circuitry on switch 10. For example, programmable logic circuits 18 of FIG. 1 may be configured to process network packets received at ports of switch 10. If desired, input/output circuitry 12 and pins 14 may be used in forming ports 126 (e.g., pins 14 and input/output circuitry 12 may receive network packets and convey the network packets to packet processing circuitry 122 via interconnect paths 16.

Storage circuitry 124 may include hard disk drive storage, nonvolatile memory (e.g., flash memory or other electrically-programmable-read-only memory configured to form a solid state drive), volatile memory (e.g., static or dynamic random-access-memory), etc. Storage circuitry may include registers 131. Registers 131 typically have faster access speeds than system memory such as random-access-memory. However, register storage capacity may be constrained relative to system memory or hard disk space. As an example, registers 131 may be able to store hundreds or thousands of data bits (e.g., 20 kilobits, 144 kilobits, etc.), whereas system random-access-memory may have storage capacity of hundreds of megabits or more. Storage structures such as databases 128, tables 130, or other data storage structures may be implemented using storage 124 (e.g., in registers 131). Information such as stored in databases 128 and tables 130 may be retrieved and used by packet processing circuitry 122 in processing network packets received at ports 126.

The example of FIG. 4 in which databases 128, tables 130, and registers 131 are included in storage 124 is merely illustrative. If desired, databases 128, tables 130, and registers 131 may be formed in any desired internal or external storage. For example, databases 128 or tables 130 may be stored in external memory such as random-access memory. Switch 10 may be implemented using one or more integrated circuits or multiple devices such as line cards. For example, packet processing circuitry 122 may be implemented using one or more programmable integrated circuits, general-purpose processors, application-specific integrated circuits, network processing units, or other packet processing circuits.

Figure 5:
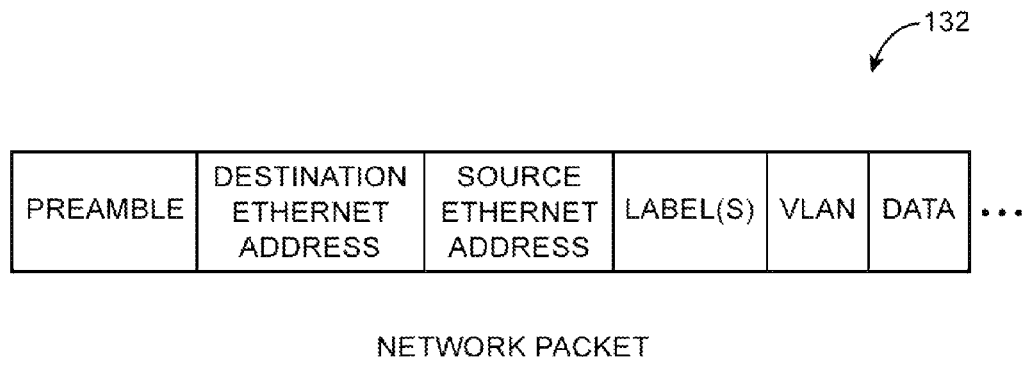
FIG. 5 is a diagram of an illustrative network packet that may be used by a packet forwarding device to maintain a network forwarding database in accordance with an embodiment of the present invention.

Network packets may be sent from source end hosts to destination end hosts. FIG. 5 is an illustrative diagram of a network packet 132 that may be forwarded through switches of a network. As shown in FIG. 5, network packet 132 may include a preamble, a source Ethernet address, a destination Ethernet address, and one or more labels (e.g., a VLAN identifier and/or other labels such as MPLS labels) stored in corresponding header fields of the network packet. If desired, network packet 132 may include any desired combination of the network attributes shown in FIG. 5, may omit header fields, or may include additional header fields associated with network protocols (e.g., IP header fields, Ethernet header fields, etc.). Network packet 132 may include data to be forwarded through the network from the source end host to the destination end host.

Network switches may forward network packet 132 through network 100 based on the network attributes stored in header fields of network packet 132. As an example, a network packet 132 from a source end host to a destination end host may include destination information from the destination end host and source information from the source end host EH1. In this scenario, an IP address of the destination end host may be stored in the destination IP address field, whereas an IP address of the source end host may be stored in the source IP address field. Similarly, Ethernet address information of the source and destination end hosts may be stored in the network packet. Switches may forward the network packet from source to destination end hosts based on the destination IP address, VLAN identifier, and other desired header fields. Some packet forwarding devices may modify the Ethernet address fields during packet processing operations (e.g., by storing their Ethernet address in the source Ethernet address fields of the network packets).

In some scenarios, one or more labels may be stored in the network packet by switches in the network. The labels may be used during packet processing operations to determine how to forward the network packet. Network packets may be modified with labels according to network protocols such as multiprotocol label switching (MPLS). For example, a first switch may add a label to the network packet that identifies which network paths should be traversed by the network packet. In this scenario, a second switch that subsequently receives the network packet may use the label to determine how to forward the network packet. If desired, the second switch may modify or replace the label or add an additional label during packet processing operations. For example, a label may be removed before reaching an end host or a different portion of the network (e.g., an end host 104 or a network portion 106).

Figure 6:
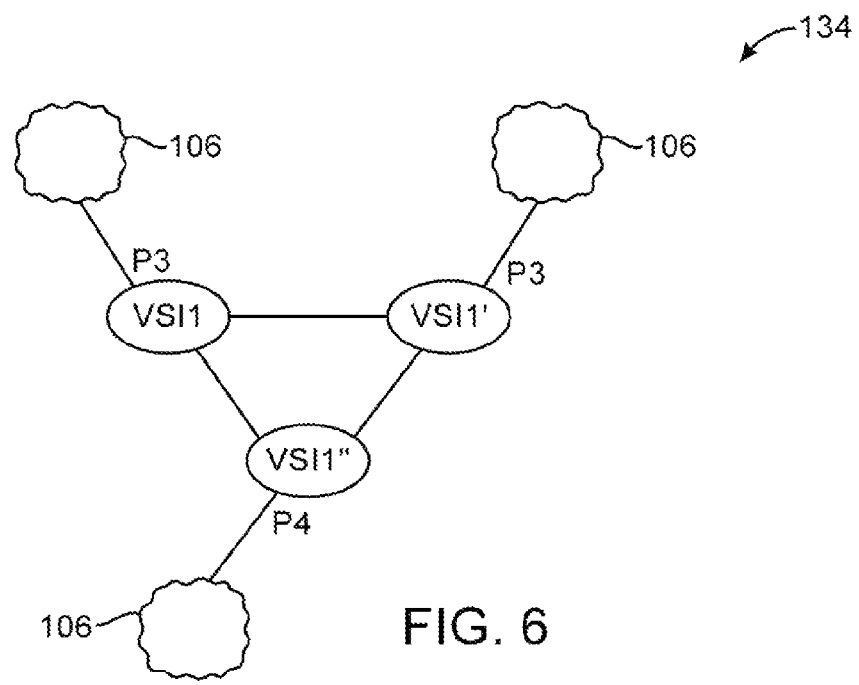
FIG. 6 is a diagram of a first illustrative virtual local area network that may be implemented using virtual switching instances in accordance with an embodiment of the present invention.

Switches 10 may be configured to implement virtual local area networks that emulate local area networks for groups of logical ports. Virtual local area networks may be formed by implementing virtual switching instances (VSIs) on the switches. Network traffic associated with different virtual local area networks may be isolated from each other by the virtual switching instances. FIG. 6 is an illustrative virtual local area network 136 that may be implemented by configuring switches 10 of FIG. 3 to implement virtual switching instances. Virtual local area network 136 may include port P3 of switch SW1, port P3 of switch SW2, and port P4 of switch SW3. Virtual switching instances VSI1, VSI1', and VSI1" may be implemented on switches SW1, SW2, and SW3, respectively. The virtual switching instances may be implemented on circuitry such as programmable logic regions.

Network traffic received at the ports of virtual local area network 134 may be constrained by the topology of virtual local area network 134 (e.g., network packets received at the ports of virtual local area network 134 may only be forwarded through switches 10 of virtual local area network 134 to other ports of virtual local area network 134).

Figure 7:
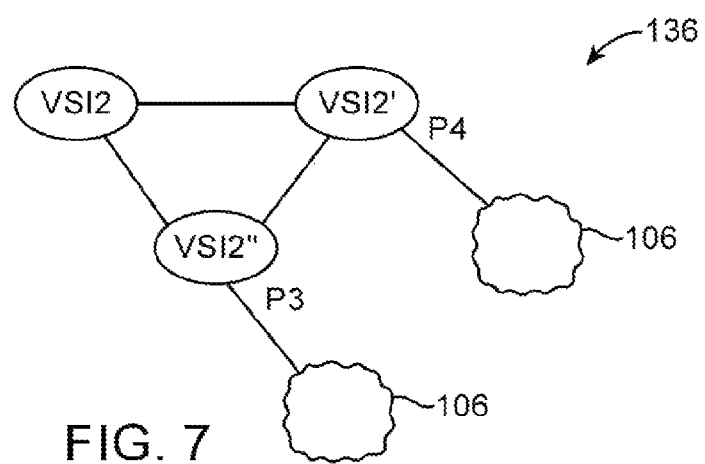
FIG. 7 is a diagram of a second illustrative virtual local area network that may be implemented using virtual switching instances in accordance with an embodiment of the present invention.

As an example, network traffic associated with virtual local area network 134 of FIG. 6 may be isolated from network traffic associated with virtual local area network 136 of FIG. 7. In the example of FIG. 7, virtual local area network 136 includes port P4 of switch SW2 and port P3 of switch SW3. Virtual switching instances VSI2, VSI2', and VSI2" may be implemented on switches SW1, SW2, and SW3, respectively (e.g., in parallel with virtual switching instances VSI1, VSI1', and VSI1"). Virtual switching instances VSI2, VSI2', and VSI2" may forward network traffic received from network portions 106 that are coupled to the ports of virtual local area network 136 to other ports of virtual local area network 136.

The virtual switching instances may be configured to isolate the network traffic of virtual local area network 136 from the network traffic of virtual local area network 134. For example, each virtual local area network may be assigned a respective label that is used by the virtual switching instances to distinguish between the network traffic of each virtual local area network.

Network switches 10 may maintain forwarding databases that are used during packet processing operations to determine how to forward network packets. FIG. 8 is an illustrative forwarding database (FDB) 142 that may be maintained by network switch SW1 of FIG. 3. Forwarding database 142 may be stored as a table or other data structure in storage 124 of FIG. 4. For example, forwarding database 142 may be stored in databases 128 or tables 130.

Forwarding database 142 may include entries 144 (e.g., entries 144A, 144B, 144C, and 144D) that include information identifying network traffic and which port should be used to forward identified network traffic. Each entry 144 may identify a virtual switching instance, a network address, a logical port of the switch, and a timestamp. Examples of virtual switching instances include virtual switching instance VSI1 of FIG. 6 and virtual switching instance VSI2 of FIG. 7. Network addresses identified by entries 144 may include hardware addresses such as Ethernet addresses or any desired hardware addresses that are assigned to network elements.

Entries 144 of a forwarding database 142 may be generated by a corresponding switch based on network packets that are received at the switch. During normal network forwarding operations, a switch may receive a network packet at a logical port of the switch. Packet processing circuitry of the switch may be used to retrieve information from header fields of the network packet. In particular, source network address information and label information may be retrieved from the header fields of the network packet. The packet processing circuitry may determine which virtual switching instance is associated with the network packet (e.g., based on label information retrieved from the network packet). Information identifying the virtual switching instance, source network address, and the logical port at which the network packet was received may be stored in a forwarding database entry 144. If desired, a timestamp that identifies the current time may be stored in the forwarding database entry (e.g., the time at which the network packet was received at the port). Entries 144 of forwarding database 142 may effectively represent the switch's current knowledge of the network topology.

In the example of FIG. 8, forwarding database entry 144A may identify that network packets associated with virtual switching instance VSI1 and having destination source network address field that matches network address ADR1 should be forwarded to port P1 of switch SW1. Network address ADR1 may, for example, be assigned to an end host 104 in network portion 106 that is coupled to port P3 of switch SW2. In this scenario, network packets received at switch SW1 that are destined for the end host may be forwarded from port P1 of switch SW1 and received at port P1 of switch SW2. Switch SW2 may similarly forward the network packet to network portion 106 via port P3 of switch SW2 based on a forwarding database 142 maintained by switch SW2.

Network packets received by switch SW1 that match forwarding database entries 144B, 144C, and 144D may be processed similarly to network packets that match entry 144A. For example, network packets associated with virtual switching instance VSI2 and network address ADR2 may be forwarded from port P2 of switch SW1.

Logical ports identified by entries 144 may include logical ports. Entry 144C may identify that network packets associated with virtual switching instance VSI1 and destined for network address ADR3 should be forwarded from virtual port V3 of switch SW1.

The virtual switching instance field and the network address field of each forwarding database entry 144 may collectively form a set of matching fields 146 that are compared to network packets by the associated switch during packet processing operations. If desired, additional matching fields may be included in set 146 or matching fields may be omitted. As an example, additional packet identification information such as header fields may be included in set 146. As another example, the virtual switching instance field may be omitted in scenarios such as when one or zero virtual switching instances have been configured.

Use of multiple matching fields in set 146 may accommodate scenarios in which multiple network elements (e.g., end hosts) share identification information for a portion (subset) of set 146. Consider the scenario in which a first end host belonging to virtual switching instance VSI1 has a network address ADR1 and a second end host belonging to virtual switching instance VSI2 is also assigned network address ADR1 (e.g., the first and second end hosts may belong to different virtual local area networks but share network address ADR1). The first end host may be located in network portion 106 that is coupled to port P3 of switch SW2, whereas the second end host may be located in network portion 106 that is coupled to port P3 of switch SW3. In this scenario, switch SW1 may generate entries 144A and 144D for the first and second end hosts based on network packets received from the end host. Entry 144A may be generated from a network packet received at time T1 from the first end host at port P1 of switch SW1 (e.g., a network packet forwarded to port P1 of switch SW1 by switch SW2). Entry 144D may be generated from a network packet received at time T3 from the second end host at port P2 of switch SW1. Entries 144A and 144D may share network address ADR1, however, the virtual switching instance matching field may allow switch SW1 to differentiate between future network packets that are destined to the first and second end hosts and correctly forward the future network packets to the end hosts.

Forwarding databases such as database 142 that are maintained by switches in a network may be updated to reflect changes in network topology. For example, one or more physical or virtual links may fail during network operations. A link may fail due to physical cable damage, full or partial switch failure, or any failure that prevents network packet forwarding through the link. As another example, an end host may be moved to different portions of a network. As yet another example, switches or other network elements may be added, removed, or reconfigured, which modifies the network topology.

Entries of forwarding database 142 may be invalidated by network topology changes. For example, if a physical link between port P1 of switch SW1 and port P1 of switch SW2 fails, entry 144A may be invalidated, because network packets sent from port P1 will fail to reach switch SW2. Network topology changes at remote locations can also invalidate entries of a switch. As an example, failure of link 112A that is coupled to port P3 of switch SW2 may invalidate entry 144A if the end host having network address ADR1 and belonging to virtual switching instance VSI1 is located in the network portion coupled to port P3 of switch SW2 (e.g., because network packets sent to the end host via port P1 of switch SW1 may fail to reach the end host). The decision to invalidate entries of forwarding database 142 as result of a topology change may be made either manually by user or automatically by a Control Plane switch. For example, a suite of Spanning Tree Protocols (e.g., performed by control Plane Switches) uses Topology Change Notification messages to request MAC flushing operation on a plurality of ports. As another example, a Label Distribution Protocol (LDP) MAC withdraw message may request deletion of all MAC entries learned on a plurality of pseudowires.

The switches may be configured to implement protocols such as the spanning tree protocol and the label distribution protocol that monitor the network topology and update forwarding databases based on detected network topology changes. To implement these protocols, the switches may be required to delete entries of the forwarding databases. Often, network topology changes affect forwarding databases on a per-port basis. For example, the spanning tree protocol and the label distribution protocol may involve protocol messages sent between switches that propagate information identifying network topology changes. A protocol message received at a port of a switch may require the switch to delete entries for all ports of the switch except the port at which the protocol message was received. As an example, a spanning tree protocol Topology Change Notification message may require the switch to delete the entries for all physical ports except the physical port at which the spanning tree protocol message was received. As another example, a label distribution protocol (LDP) protocol may require the switch to delete the entries for all pseudowires except for the pseudowire that received the label distribution protocol message.

Switches may be configured to automatically delete (remove) entries 144 of forwarding database 142 after a desired time period. The time period may be determined by a user or may be a default time period such as 300 seconds. When the current time is equal to or exceeds the time at which an entry was most recently learned (e.g., updated or generated) plus the threshold time period, the entry may be considered to have "aged" out (expired) and the switch may delete the expired entry. By removing expired entries of the forwarding databases, the switches may help to ensure that the forwarding databases are maintained with current network topology information. For example, if a link between an end host and a switch fails, then network packets sent by the end host may fail to reach the switch. In this scenario, a forwarding database entry for the end host may include incorrect forwarding information associated with a time-stamp that occurs before the link failure. The time-stamp may not be subsequently updated, because future network packets from the end host may fail to reach the switch. The forwarding database entry may therefore be deleted when the current time reaches the time of the time-stamp plus the threshold time period.

Figure 9:
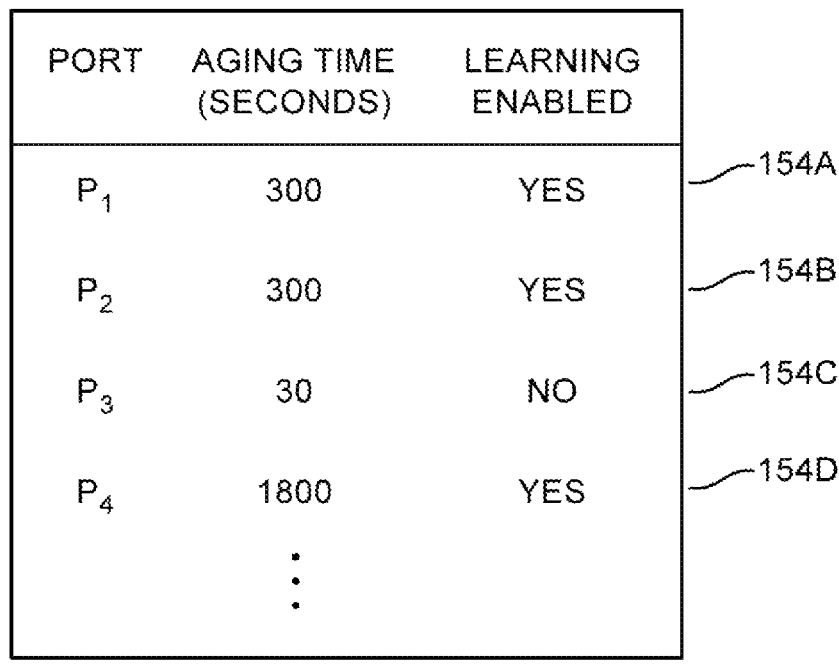
FIG. 9 is a diagram of an illustrative per-port aging table that may be maintained by a packet forwarding device in accordance with an embodiment of the present invention.

The switches may maintain aging tables having aging table entries that identify threshold time periods. The aging tables may be stored in storage at the switches and used during packet processing operations. FIG. 9 is an illustrative diagram of an aging table 152 that may be maintained by switch SW1 of FIG. 3. This example is merely illustrative. Some or all of the switches in network 100 may maintain respective aging tables 152.

As shown in FIG. 9, aging table 152 may include entries 154 (e.g., entries 154A, 154B, 154C, and 154D). Aging table 152 may be referred to as a per-port aging table, because each entry 154 corresponds to a respective port of switch SW1. Each entry 154 may identify a port, an associated aging time, and whether or not topology learning (e.g., network address learning) is enabled at the identified port. Entry 154A may identify port P1, an aging time of 300 seconds, and that learning is enabled at port P1, whereas entry 154B may identify port P2, an aging time of 300 seconds, that learning is enabled at port P2, and so on. Ports that are identified in aging table 152 may include logical ports such as physical ports, virtual ports, or both.

During normal operation, switch 10 may use per-port aging table 152 and forwarding database 142 (FIG. 8) to determine whether entries of forwarding database 142 have expired and should therefore be deleted. For each entry 154 of per-port aging table 152, switch SW1 may identify matching entries of forwarding database 142 that are associated with the same port. For example, entry 154A identifies port P1, which matches with entry 144A of database 142. As another example, entry 154B of per-port aging table 152 matches with entries 144B and 144D of forwarding database 142. The current time may be compared to the time of the per-port aging table entry 154 plus the time-stamp of each matching entry 144 to determine whether that matching entry 144 should be deleted.

Comparison operations using per-port aging table 152 and forwarding database 142 may, if desired, be performed periodically to maintain forwarding database 142. Switches may maintain aging tables with entries that correspond to individual ports (e.g., per-port aging tables) or groups of ports (sometimes referred to herein as per-group aging tables). By maintaining aging tables with port-based entries, switches may more efficiently utilize available resources in comparison to other aging mechanisms that require excessive numbers of entries such as when aging tables are maintained per virtual switching instance. For example, a network forwarding device may be used to implement thousands of virtual switching instances, yet only have 64 ports. In this scenario, the number of aging table entries may be less than or equal to 64 (e.g., instead of thousands of aging table entries). Reducing the number of aging table entries may be especially desirable in scenarios such as when switches are implemented using programmable integrated circuit devices, because programmable integrated circuit devices may have a constrained number of storage resources such as registers.

MAC addresses learning may be disabled on a per-entry basis. In other words, each entry may identify whether or not MAC addresses learning is enabled for the corresponding port(s). The switch may update forwarding database 142 for ports that have MAC addresses learning enabled (e.g., based on network packets that are received at the ports). Updating of forwarding database 142 for ports with disabled MAC addresses learning may be blocked (disabled). In the example of FIG. 9, port P3 of entry 154C may be disabled, which prevents updates to forwarding database 142 that are associated with port P3. Therefore, any existing forwarding database entries associated with port P3 will eventually expire (e.g., 30 seconds after the time-stamp of the existing forwarding database entries that are associated with port P3).

Per-port aging tables may be desirable in scenarios such as when switch 10 includes a relatively small number of ports (e.g., 2 ports, 4 ports, 8 ports, etc.). In particular, per-port aging tables may be desirable when the number of ports is sufficiently small that per-port aging table 152 can be entirely stored in registers or flip-flops of switch 10 (e.g., registers of programmable logic device 10), which helps to improve switching performance (e.g., because it is not necessary to access system memory having slower access times than registers).

Figure 10:
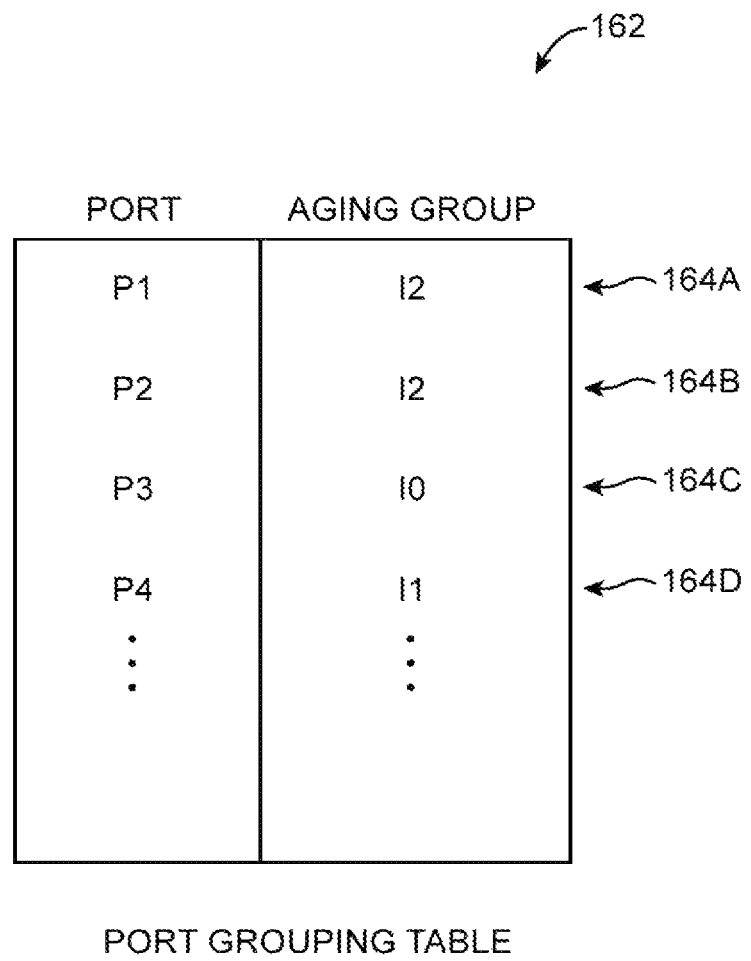
FIG. 10 is a diagram of an illustrative port grouping table that may be maintained by a packet forwarding device in accordance with an embodiment of the present invention.

For switches having excessive numbers of ports, the switches may be configured to group the ports into aging groups. Port grouping may be especially desirable in scenarios such as when registers of a switch have insufficient available capacity to store a per-port aging table having entries for each port of the switch. FIG. 10 is an illustrative port grouping table 162 that may be maintained by a switch in network 10. Port grouping table 162 may include entries 164 such as entries 164A, 164B, 164C, and 164D.

Each entry 164 may identify a logical port of the switch and a group to which the port is assigned. The groups may be referred to as aging groups, because the ports that belong to a particular group may be processed together during aging operations. In the example of FIG. 10, ports P1 and P2 may be assigned to aging group I2 (entries 164A and 164B), whereas port P3 may be assigned to aging group I0 (entry 164C) and port P4 may be assigned to aging group I1 (entry 164D).

Port grouping table 162 may be stored in storage 124 such as registers of switch 10 (see, e.g., FIG. 4). The aging groups defined in port grouping table 162 may be used to form a per-group aging table. FIG. 11 is an illustrative per-group aging table 172 that may be maintained by a switch in conjunction with port grouping table 162 of FIG. 10. Per-group aging table 172 may include entries 174 such as entries 174A, 174B, and 174C.

Each entry 174 may correspond to a respective aging group. Entry 174A corresponds to aging group I0 (e.g., port P3 of the switch), entry 174B corresponds to aging group I1 (e.g., port P4 of the switch), and entry 174C corresponds to aging group I2 (e.g., aging groups P1 and P2 of the switch). The example of FIGS. 10 and 11 in which three aging groups are formed from the ports of the switch are merely illustrative. In general, the number of aging groups is less than or equal to the number of ports of the switch so that the ports of the switch are divided among the aging groups.

Each entry 174 may identify an aging threshold time for the corresponding aging group similarly to the per-port aging threshold times of FIG. 9, but on a per-group basis. For example, entry 174C may define an aging threshold of 30 seconds for aging group I2. In this scenario, the 30 second aging threshold may be applied to each entry of forwarding database 142 that is associated with any of the ports of aging group I2. Forwarding database entry 144A associated with port P1 of port grouping table entry 164A may expire 30 seconds after time-stamp T1, unless time-stamp T1 is updated based on a newly received network packet at the switch. Similarly, forwarding database entries 144B and 144D that are associated with port P2 of port grouping table entry 164B may expire 30 seconds after time stamps T2 and T3, respectively.

MAC addresses learning for groups of ports defined by an aging group and associated port grouping table 162 may be enabled or disabled similarly to learning for individual ports. In the example of FIG. 11, learning may be disabled for aging group I1 that includes port P4 of the switch, whereas learning for aging groups I2 (e.g., ports P1 and P2) and I0 (e.g., port P3) may be enabled.

Figure 12:
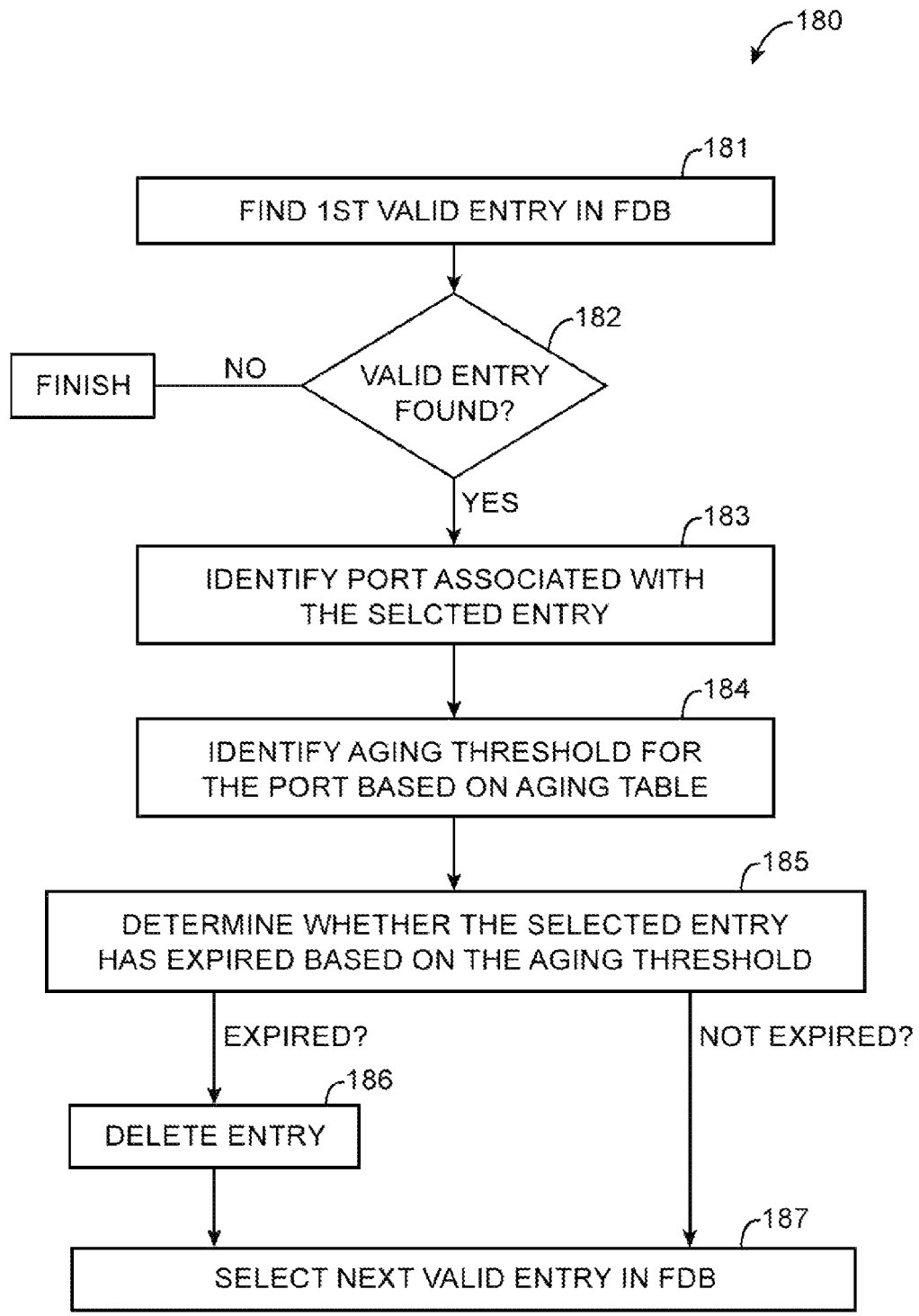
FIG. 12 is an illustrative flow chart of an aging process that may be performed by a packet forwarding device using an aging table in accordance with an embodiment of the present invention.

FIG. 12 is a flow chart 180 of illustrative steps that may be performed to process a forwarding database using an aging table such as per-group aging table 172 of FIG. 11 or per-port aging table 152 of FIG. 9. The steps of flow chart 180 may be performed periodically by a switch using packet processing circuitry 122 (FIG. 4) to maintain the forwarding database (e.g., forwarding database 142 of FIG. 8).

During step 181, the switch may select the first valid entry in the forwarding database. The switch may subsequently determine whether a valid forwarding database entry was selected (found) during step 182. If no valid entry was found, the operations of flow chart 180 may be complete. If a valid entry was selected, the operations of step 183 may be performed.

During step 183, the switch may identify a port associated with the selected entry. During step 184, the switch may identify an aging threshold value (e.g., an aging timer) for the identified port based on the aging table (e.g., based on a per-port aging table or a per-group aging table).

During step 185, the switch may determine whether the selected entry has expired based on the aging threshold. In response to determining that the forwarding database entry has expired, the switch may delete the entry during step 186. If the forwarding database entry has not expired (e.g., is still valid), the switch may select the next valid entry in the forwarding database during step 187.

Figure 13:
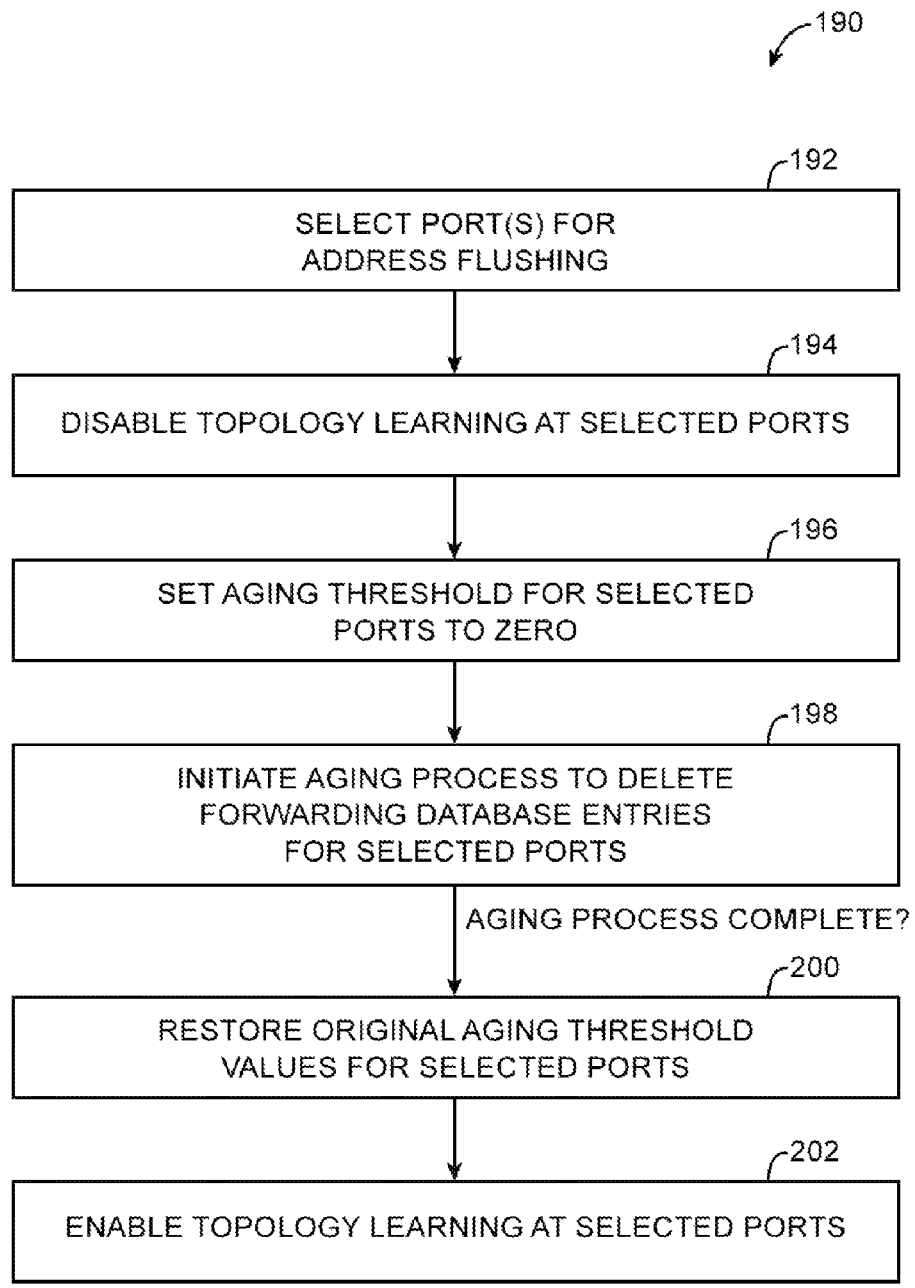
FIG. 13 is a flow chart of illustrative steps that may be performed by a packet forwarding device to perform selective forwarding database flushing in accordance with an embodiment of the present invention.

Switch 10 may delete (remove) groups of forwarding database entries on a per-port or a per-group basis (sometimes referred to as per-port or per-group flushing of the forwarding database). Per-port and per-group flushing may be performed using aging tables such as per-port aging table 152 (FIG. 9) and per-group aging table 172 (FIG. 11). By performing forwarding database flushing using aging tables instead of using dedicated flushing circuitry, constrained resources of switch 10 may be more efficiently utilized. FIG. 13 is a flow chart 190 of illustrative steps that may be performed by a switch using packet processing circuitry to perform per-port or per-group flushing.

During step 192, the switch may select one or more ports for address flushing (i.e., flushing of forwarding database entries). The switch may select the ports as a part of implementing a network protocol for monitoring network topology changes (e.g., a spanning tree protocol, the label discovery protocol, etc.).

During step 194, the switch may disable topology learning at the selected ports. The topology learning may be disabled by modifying entries of a per-port aging table or per-group aging table. By disabling topology learning, potential race conditions associated with simultaneous deleting and updating of forwarding database entries may be avoided. The switch may store information identifying which of the selected ports originally had enabled topology learning and/or which of the selected ports originally have disabled topology learning. The information may be stored in storage at the switch.

During subsequent step 196, the switch may set the aging threshold for the selected ports to zero (or, if desired, some other minimal value). The aging threshold may be set by modifying aging table entries that are associated with the selected ports. The original aging threshold values may be stored in storage such as storage 124 (FIG. 4).

During step 198, the switch may initiate an aging process to delete all forwarding database entries associated with the selected ports. For example, the aging process of flow chart 180 of FIG. 12 may be performed. In this scenario, the forwarding database entries that are associated with the selected ports may be removed during step 188, because the aging threshold for the selected ports is zero (i.e., because the current time is always subsequent to the timestamp of the forwarding database entries that have been previously generated). Switch 10 may wait until the aging process has been completed before proceeding to step 200 (e.g., until steps 182-190 have been completed).

During subsequent step 200, the switch may restore the original aging threshold values for the selected ports so that aging is performed normally. The original aging threshold values may have been stored during step 196 and may be retrieved from storage during step 200.

During step 202, the switch may re-enable topology learning at the selected ports. If desired, the switch may restore topology learning for only ports that originally had enabled topology learning using information stored during step 194 (e.g., ports that had disabled topology learning prior to step 192 may remain disabled). If desired, steps 200 and 202 may be performed in reverse order or simultaneously.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating a network switch having ports at which network packets are received, the method comprising:
   forming a plurality of port aging groups each associated with at least one respective port of the network switch;
   maintaining aging threshold values each associated with a respective port aging group of the plurality of port aging groups;
   performing network address learning operations to maintain a packet forwarding database having forwarding database entries that are each associated with a corresponding port;
   identifying expired forwarding database entries based on the aging threshold values;
   identifying ports of the network switch that are associated with a network topology change; and
   performing network address flushing operations on entries in the packet forwarding database using the aging threshold values, wherein the network address flushing operations comprise temporarily disabling the network address learning operations on the identified ports.

2. The method defined in claim 1 wherein each aging threshold value is associated with a respective timestamp and wherein identifying the expired forwarding database entries based on the aging threshold values comprises comparing the timestamps to the aging threshold values.

3. The method defined in claim 2 further comprising:
   monitoring the network packets received at the ports to identify the network topology change; and
   identifying the ports of the network switch that are associated with the network topology change in response to identifying the network topology change.

4. The method defined in claim 3 further comprising:
   performing the network address flushing operations on only the entries of the packet forwarding database that are associated with the identified ports using the aging threshold values.

5. The method defined in claim 4 wherein each port aging group is associated with a plurality of respective ports and wherein forming the plurality of port aging groups comprises:
   maintaining a port grouping table that identifies which ports are associated with each port aging group.

6. The method defined in claim 4 wherein maintaining the aging threshold values comprises:
   maintaining an aging table having aging table entries that identify which port aging group is associated with each aging threshold value.

7. The method defined in claim 4 wherein performing the network address learning operations comprises:
   identifying a Media Access Control address from each of the received network packets; and
   generating the entries for the packet forwarding database to identify which port each network packet is received, the Media Access Control address of that network packet, and a timestamp for that network packet.

8. The method defined in claim 4 wherein performing the network address flushing operations on only the entries of the packet forwarding database that are associated with the identified ports using the aging threshold values further comprises:

identifying which aging threshold values are associated with the identified ports;

setting the identified aging threshold values to zero.

9. The method defined in claim 8 wherein performing the network address flushing operations on only the entries of the packet forwarding database that are associated with the identified ports using the aging threshold values further comprises:

performing an aging process on the packet forwarding database using the aging threshold values to delete the forwarding database entries that are associated with the identified ports.

10. The method defined in claim 9 wherein performing the network address flushing operations on only the entries of the packet forwarding database that are associated with the identified ports using the aging threshold values further comprises:

prior to setting the identified aging threshold values to zero, storing the aging threshold values.

11. The method defined in claim 10 further comprising:

subsequent to performing the aging process on the packet forwarding database, restoring the stored aging threshold values.

12. The method defined in claim 11 further comprising:

subsequent to performing the aging process on the packet forwarding database, re-enabling the network address learning operations on the identified ports.

13. A network packet forwarding device comprising:

a plurality of ports at which network packets are received;

packet processing circuitry that maintains a network forwarding database and an aging table, wherein the packet processing circuitry performs a flushing operation that deletes selected forwarding database entries of the network forwarding database using the aging table; and storage circuitry at which the network forwarding database and the aging table are stored, wherein the aging table comprises a per-port aging table having aging table entries, and each aging table entry only identifies a single different port of the plurality of ports.

14. The network packet forwarding device defined in claim 13 wherein the aging table comprises a per-group aging table having aging table entries that each corresponds to a respective group of ports of the plurality of ports.

15. The network packet forwarding device defined in claim 14 wherein each aging table entry includes a threshold time value and wherein the packet processing circuitry deletes forwarding database entries that have expired based on the threshold time values.

16. The network packet forwarding device defined in claim 15 wherein the packet processing circuitry performs the flushing operation by setting at least one of the threshold time values to zero.

17. The network packet forwarding device defined in claim 13 further comprising:

programmable circuitry that implements the packet processing circuitry.

18. The network packet forwarding device defined in claim 13 wherein the packet processing circuitry implements a plurality of virtual network switching instances.

19. The network packet forwarding device defined in claim 13, wherein the aging table is separate from the network forwarding database.

20. The network packet forwarding device defined in claim 13, wherein the flushing operation performed by the packet processing circuitry deletes an entirety of the selected forwarding database entries of the network forwarding database using the aging table.

21. The network packet forwarding device defined in claim 13, wherein the packet processing circuitry disables network address learning operations on ports of the network packet forwarding device that are associated with a network topology change.

22. A method of operating a network switch having ports at which network packets are received, the method comprising:

maintaining a packet forwarding database having forwarding database entries that are each associated with a corresponding port of the network switch;

selecting a port of the network switch;

identifying every forwarding database entry in the packet forwarding database that is associated with the selected port; and deleting all of the identified forwarding database entries that are associated with the selected port from the packet forwarding database prior to selecting an additional port of the network switch.

23. The method defined in claim 22 further comprising:

maintaining an aging table having aging table entries that each identifies an aging threshold value and at least one port of the network switch;

identifying an aging table entry that corresponds to the selected port; and setting the aging threshold value of the identified aging table entry to zero.

24. The method defined in claim 23 wherein deleting the identified forwarding database entries from the packet forwarding database comprises:

performing an aging process on the aging table to delete the identified forwarding database entries.

25. The method defined in claim 22 wherein each forwarding database entry includes at least one matching field that identifies network packets corresponding to that forwarding database entry and wherein maintaining the packet forwarding database comprises:

based on the network packets received at the ports, performing network addresses learning operations at each of the ports of the network switch to update the forwarding database entries.

26. The method defined in claim 22, further comprising:

temporarily disabling network address learning operations on ports of the network switch that are associated with a network topology change.

27. The network packet forwarding device defined in claim 13, wherein the selected forwarding database entries each comprise respective time stamp fields that are separate from the aging table.

28. The method defined in claim 22, further comprising:

after all of the identified forwarding database entries that are associated with the selected port have been deleted from the packet forwarding database, selecting an additional port of the network switch;

identifying every forwarding database entry in the packet forwarding database that is associated with the selected additional port; and deleting all of the identified forwarding database entries that are associated with the selected additional port from the packet forwarding database.

\* \* \* \* \*